United States Patent
Horton et al.

(10) Patent No.: US 7,517,835 B2
(45) Date of Patent: *Apr. 14, 2009

(54) SURFACTANT-POLYMER COMPOSITIONS FOR ENHANCING THE STABILITY OF VISCOELASTIC-SURFACTANT BASED FLUID

(75) Inventors: Robert L. Horton, Sugar Land, TX (US); Bethicia B. Prasek, Houston, TX (US); Frederick B. Growcock, Houston, TX (US); David P. Kippie, Katy, TX (US); John W. Vian, Deer Park, TX (US); Kamila B. Abdur-Rahman, Houston, TX (US); Morris Arvie, Houston, TX (US)

(73) Assignee: M-I LLC, Houston, TX (US)

( * ) Notice: Subject to any disclaimer, the term of this patent is extended or adjusted under 35 U.S.C. 154(b) by 424 days.

This patent is subject to a terminal disclaimer.

(21) Appl. No.: 11/273,350

(22) Filed: Nov. 14, 2005

(65) Prior Publication Data

US 2006/0100109 A1 May 11, 2006

Related U.S. Application Data

(63) Continuation of application No. 10/620,041, filed on Jul. 15, 2003, now Pat. No. 7,157,409.

(60) Provisional application No. 60/319,575, filed on Sep. 25, 2002.

(51) Int. Cl.
*C09K 8/60* (2006.01)
*C09K 3/00* (2006.01)

(52) U.S. Cl. .......... 507/222; 507/240; 507/277; 516/73

(58) Field of Classification Search ......... 507/222, 507/240, 241, 244, 260, 269, 277; 516/73
See application file for complete search history.

(56) References Cited

U.S. PATENT DOCUMENTS

| | | | | |
|---|---|---|---|---|
| 3,691,106 | A * | 9/1972 | Erdy ............... | 510/418 |
| 4,409,110 | A * | 10/1983 | Borchardt et al. ...... | 507/227 |
| 6,433,075 | B1 * | 8/2002 | Davies et al. ......... | 524/815 |
| 6,613,720 | B1 * | 9/2003 | Feraud et al. ......... | 507/200 |
| 6,767,869 | B2 * | 7/2004 | DiLullo et al. ........ | 507/244 |
| 7,157,409 | B2 * | 1/2007 | Horton et al. ......... | 507/222 |

* cited by examiner

*Primary Examiner*—Timothy J Kugel
(74) *Attorney, Agent, or Firm*—Osha • Liang LLP

(57) ABSTRACT

Compositions for increasing the thermal and pressure stability of well fluids viscosified using viscoelastic surfactants, the compositions including an effective amount of an oligomeric or polymeric compound that has a thermally stable backbone structure and at least one pendent viscoelastic surfactant functional group. Preferred compositions for increasing the stability of well fluids viscosified using monomeric viscoelastic surfactants include an effective amount of an oligomeric or polymeric compound that has a thermally stable backbone structure and a multiplicity of pendent viscoelastic surfactant functional groups attached to said backbone structure through relatively long hydrocarbon chains, 1 to 18 carbons in length.

19 Claims, No Drawings

SURFACTANT-POLYMER COMPOSITIONS FOR ENHANCING THE STABILITY OF VISCOELASTIC-SURFACTANT BASED FLUID

This application is a continuation of U.S. patent application Ser. No. 10/620,041, filed Jul. 15, 2003, now U.S. Pat. No. 7,157,409, which claims the benefit of U.S. Provisional Application No. 60/319,575, filed Sep. 25, 2002, both of which are incorporated by reference herein.

BACKGROUND

When drilling or completing wells in earth formations, various fluids typically are used in the well for a variety of reasons. For the purposes of the present disclosure, such a fluid will be referred to as a "well fluid." Common uses for well fluids include: lubrication and cooling of drill bit cutting surfaces while drilling generally or drilling-in (i.e., drilling into a targeted formation), transportation of cuttings to the surface, controlling formation pressure to prevent blowouts, maintaining well stability, suspending solids in the well, minimizing fluid loss into and stabilizing the formation through which a well is being drilled, fracturing the formation in the vicinity of a well, displacing the fluid within a well with another fluid, cleaning a well, testing a well, emplacing spacer or fluid loss control pills at various points in the displacement, completion, or work-over process, emplacing a packer fluid in the completed wellbore during production, preparing the well for abandonment, abandoning the well or, otherwise treating the well or the formation. A commonly used type of well fluid is based on water-based solutions including brines. Brines, such as $CaBr_2$ brine, are commonly used as well fluids because of the ability to control the density of the solution over a wide density range. Further the brines are typically substantially free of suspended solids and brines typically do not damage the more common types of subterranean formations.

When drilling progresses to the level of penetrating a hydrocarbon-bearing formation, special care may be required to maintain the stability of the wellbore. Examples of formations in which problems often arise are highly permeable and/or poorly consolidated formation and thus a technique known as "under-reaming" may be employed. In conducting the under-reaming process, the wellbore is drilled to penetrate the hydrocarbon-bearing zone using conventional techniques. A casing generally is set in the wellbore to a point just above the hydrocarbon-bearing zone. The hydrocarbon-bearing zone then may be re-drilled to a wider diameter, for example, using an expandable under-reamer that increases the diameter of the wellbore. Under-reaming usually is performed using special "clean" drilling fluids. Typically the "clean" drilling fluids used in under-reaming are aqueous, dense brines that are viscosified with a gelling and/or cross-linked polymer to aid in the removal of formation cuttings. The expense of such fluids limits their general use in the drilling process.

When the target subterranean formation has a high permeability a significant quantity of the drilling fluid may be lost into the formation. Once the drilling fluid is lost into the formation, it becomes difficult to remove. Removal of the aqueous based well fluids is desired to maximize the production of the hydrocarbon in the formation. It is well known in the art that calcium- and zinc-bromide brines can form highly stable, acid insoluble compounds when reacted with the formation rock itself or with substances contained within the formation. These reactions often may substantially reduce the permeability of the formation to any subsequent out-flow of the desired hydrocarbons. As should be well known in the art, it is widely and generally accepted that the most effective way to prevent such damage to the formation is to limit fluid loss into the formation. Thus, providing effective fluid loss control is highly desirable to prevent damaging the hydrocarbon-bearing formation. For example such damage may occur during, completion, drilling, drill-in, displacement, hydraulic fracturing, work-over, packer fluid emplacement or maintenance, well treating, or testing operations.

Techniques that have been developed to control fluid loss include the use of fluid loss control "pills." As the term is used in this disclosure a "pill" is a quantity of fluid added to the well fluid so as to temporarily change the properties of the well bore fluid at or near a specific point in the well bore. Significant research has been directed to determining suitable materials for the fluid loss pills, as well as controlling and improving the properties of the fluid loss pills. Typically, fluid loss pills work by enhancing filter-cake buildup on the face of the formation to inhibit fluid flow into the formation from the wellbore; however the fluids in accordance with the claimed subject matter are effective by developing extremely high viscosity in the environment at and just within the face of the formation to inhibit fluid flow into the formation from the wellbore. Because of the high temperatures, high shear (caused by the pumping and placement of the pill), high pressures, and low pH to which well fluids may be exposed (i.e., "stress conditions"), synthetic polymeric materials typically used to form fluid loss pills and to viscosify the well fluids tend to degrade rather quickly.

One class of viscosifiers commonly used in the petroleum industry comprises polymeric structures starting with molecular weights of hundreds of thousands to several million grams per mole. These large, chemically bonded structures are often crosslinked to further increase molecular weight and effective viscosity per gram of polymer added to the fluid. These large molecules are quite stable under the thermal conditions typically encountered in a subterranean reservoir. However, this thermal stability is believed to contribute to decreased well productivity. As a result, expensive and often corrosive breakers have been designed to destroy the molecular backbone of these polymeric structures. These breakers are typically oxidizers or enzymes and are at best only partially effective with typical reservoir cleanup less than 80% complete and more usually much less than 50% complete. It is also reported in the literature that the long term stability of polymeric based thickening agents is shortened by the high temperature, high shear, high pressures, and low pH to which well fluids may be exposed (i.e., "stress conditions").

Viscoelastic surfactants are commonly used in the petroleum industry as an alternative to the above mentioned polymeric thickening agents. Viscoelastic surfactants are relatively small molecules with each molecule being typically less than 500 grams per mole (i.e., molecular weight less than 500). These small molecules will associate under certain conditions to form structures which resemble the polymer molecules but which are not stable structures. The individual molecules of surfactant begin to associate to form rod-like or spiraling-cylinder-like micelles. These micelle structures are always in an equilibrium state of breaking and reforming. As dynamic structures, these polymer-shaped micelles are readily destroyed by shear, presence of hydrocarbons or increased temperature. While these features are desirable especially in a hydrocarbon-bearing formation, there is minimal control over the conditions under which micelle breakup occurs. Therefore, under conditions of exposure to oil, high temperature, high shear, or other "stress conditions", the viscoelastic surfactants rapidly return to their original small independent spherical micellar state. When the viscoelastic micelles are broken down to this small independent spherical micellar state, the desired viscous nature of the well fluid is lost. In some cases the loss is temporary, in others the loss may be more permanent.

Presently there exists an unmet need for a simple, inexpensive way to increase the thermal range for viscoelastic-surfactant-based viscosifying agents used in downhole applications. Preferably, this thermal extender would be applicable to various viscoelastic-surfactant-based viscosifying agents.

SUMMARY

Upon review of the following disclosed and claimed subject matter, one of skill in the art should appreciate and understand that one illustrative embodiment is a wellbore fluid that includes: an aqueous based continuous phase; a viscoelastic surfactant; and a surfactant-polymer compound soluble in an aqueous solution. The surfactant-polymer compound has a molecular structure including a hydrophobic backbone and a plurality of hydrophilic functional groups attached to the hydrophobic backbone. The hydrophobic backbone is the reaction product of one or more molecules having polymerizable alkene or alkyne functional groups, for example an oligo- or poly-ethylene structure. In contrast the hydrophilic functional groups can be zwitterionic surfactant functional groups, anionic surfactant functional groups, cationic surfactant functional groups, and nonionic surfactant functional groups. The illustrative embodiment is molecularly designed such that the combination of the viscoelastic surfactant and surfactant-polymer compound forms micellar assemblies in the wellbore fluid. In one illustrative and exemplary embodiment the acid form of the surfactant-polymer compound has the structure:

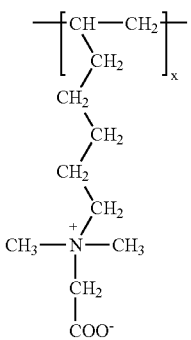

in which x has a value of 2 to 300,000 and preferably x has a value of 2 to 36 Alternatively, the surfactant-polymer compound can be a salt of oligo- or poly-(α-alkenyl-ω- or α-alkynyl-ω-quaternary-ammonio-N-N-dialkyl-N-alkylcarboxylate) or a mixture further comprising a salt of N-alkyl-N-carboxymethyl-N,N-dimethylammonium chloride. Another alternative and illustrative embodiment is where the surfactant-polymer compound is a salt of oligo- or poly-(1-hepten-7-quaternary-ammonio-N ,N-dimethyl-N-methylcarboxylate) or a mixture further comprising a salt of N-hexadecyl-N-carboxymethyl-N,N-dimethylammonium chloride. A third alternative is where the surfactant-polymer compound is a salt of oligo- or poly-(α-alkenyl-ω- or α-alkynyl-ω-quaternary-ammonio-N,N-dialkyl-N-alkylcarboxylate),or is a salt of oligo- or poly-(1-hepten-7-quaternary-ammonio-N,N-dimethyl-N-methylcarboxylate).

Additional embodiments of the claimed subject matter include zwitterionic surfactant heads such that the polymers or oligomers have the following structures:

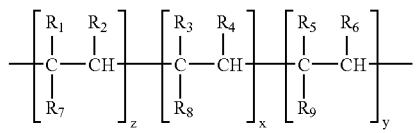

in which $R_1, R_2, R_3, R_4, R_5, R_6$=H or $CH_3$

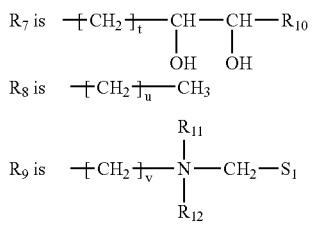

and in which $R_{10}, R_{11}, R_{12}$=H or $CH_3$, and t=1 to 16, u=6 to 12, v=1 to 18, w=1 to 3, and x+y+z=3 to 300,000 and $S_1$=$CO_2^-$ or $SO_3^-$. In a preferred illustrative embodiment, t=12 to 16, μ=6 to 12; v=12 to 18, w=1 to 3, x=0 to 10,000, y=2 to 300,000 and z=0 to 10,000

Alternatively the oligomer or polymer compound can be cationic in the surfactant head and thus have a structure such as:

in which $R_1, R_2, R_3, R_4, R_5, R_6$=H or $CH_3$

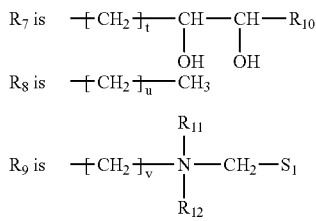

and in which $R_{10}, R_{11}, R_{12}$=H or $CH_3$, t=1 to 16, u=6 to 12, v=1 to 18, and x+y+z=3 to 300,000. An especially preferred and illustrative embodiment includes an oligomer or polymer in which t=12 to 16, u=6 to 12, v=12 to 18, w=1 to 3, and x=0 to 10,000, y=2 to 300,000, and z=0 to 10,000.

In yet another illustrative embodiment, the oligomer or polymer can have a molecular structure that includes an anionic surfactant functional group such as:

where $R_1, R_2, R_3, R_4, R_5, R_6$=H or $CH_3$

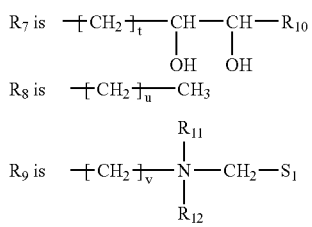

in which $R_{10}, R_{11}, R_{12}$=H or $CH_3$, t=1 to 16, u=6 to 12, v=1 to 18, x+y+z=3 to 300,000, and $S_1$=$CO_2^-$ or $SO_3^-$. In one such illustrative embodiment, it is preferred that t=12 to 16, u=6 to 12, v=12 to 18, x=0 to 10, 000, y=2 to 300,000, and z=0 to 10,000.

Further as noted above, the illustrative oligomer or polymer can have a nonionic surfactant group and preferably has a molecular structure such as:

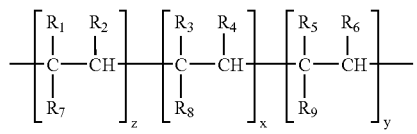

in which $R_1, R_2, R_3, R_4, R_5, R_6$=H or $CH_3$

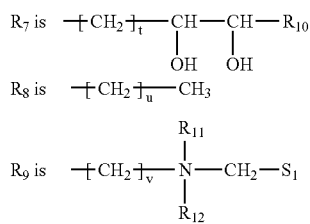

and in which, $R_{10}, R_{11}, R_{12}$=H or $CH_3$, t=1 to 16, u=6 to 12, v=1 to 18, $S_1$=$CO_2^-$ or $SO_3^-$, and x+y+z=3 to 300,000. In such instances, a preferred illustrative embodiment is achieved when t=12 to 16, u=6 to 12, v=12 to 18, and x=0 to 10,000, y=2 to 300,000 and z=0 to 10,000.

Fundamentally the polymeric backbone can be saturated as noted in the above illustrative examples or unsaturated. In such illustrative embodiments, the oligomer or polymer has a back bone structure such as the following:

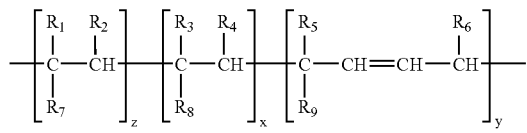

in which $R_1, R_2, R_3, R_4, R_5, R_6$=H or $CH_3$. As for the $R_7$, $R_8$ and $R_9$ groups, these may be the same as those disclosed above. Thus one of skill in the art should appreciate that zwitterionic, cationic, anionic and nonionic surfactant groups may be attached to the unsaturated backbone structure shown above and that such compounds are illustrative of the disclosed and claimed subject matter.

As discussed above, the novel oligomers and polymers taught in accordance with the claimed subject matter contain chemical functional groups that are similar to those found in conventional viscoelastic surfactants and thus are highly compatible with conventional viscoelastic surfactant systems. Accordingly, the claimed subject matter teaches blends of the viscoelastic oligomers or polymers with conventional viscoelastic surfactant systems. The conventional viscoelastic-surfactant-based fluids useful for the claimed subject matter are those in the following references, all of which are incorporated herein by reference—Canadian Patent 1,298, 697, U.S. Pat. Nos. 4,615,825, 4,695,389, 4,725,372, 5,258, 137, 5,551,516, 5,691,292, 5,964,295, 5,965,502, 5,979,555, 5,979,557, 6,140,277, 6,194,355, 6,194,356, 6,211,120, 6,232,274, 6,239,183, Paper SPE 17,168, Paper SPE 30,098, Paper SPE 30,114, Paper SPE 30,458, Paper SPE 31,114, Paper SPE 38,622, Paper SPE 56,467, Paper SPE 57,432, Paper SPE 59,478, and Paper SPE 60,322. Of these, the preferred viscoelastic-surfactant-based fluids are those based on anionic, cationic, or zwitterionic surfactants or mixtures of anionic and nonionic surfactants or mixtures of cationic and nonionic surfactants or mixtures of zwitterionic and nonionic surfactants. And of these, the particularly preferred viscoelastic-surfactant-based fluids are those based on zwitterionic surfactants or mixtures of zwitterionic and nonionic surfactants. In both the preferred viscoelastic-surfactant-based fluids, and in the particularly preferred viscoelastic-surfactant-based fluids, a minority amount of an additional surfactant, termed a "co-surfactant", such as, for example, 2-ethylhexanol or SDBS may optionally be employed. The viscoelastic oligomers or polymers of the claimed subject matter may be created in the presence of conventional viscoelastic surfactant systems or may be synthesized in separate steps, optionally processed or dried, and then subsequently admixed into a solution of conventional viscoelastic surfactants.

It has been found that the oligomers or polymers of the illustrative drilling fluids can be crosslinked with polyvalent metal ions, formaldehyde, or glutaraldehyde. In one such embodiment, the polyvalent metal ions are selected from: $Fe^{2+}, Cd^{2+}, Co^{2+}, Ca^{2+}, Cu^{2+}, UO_2^{2+}, PbO^{2+}, Al^{3+}, Fe^{3+}, Cr^{3+}, Ce^{3+}, Ti^{4+}, Zr^{4+}, Sn^{4+}$ and mixtures thereof.

One of skill in the art should also appreciate that the disclosed and claimed subject matter includes a method of making a wellbore fluid as is disclosed herein. In one such illustrative embodiment, the method involves the blending of an aqueous fluid phase, a viscoelastic surfactant, a water-soluble inorganic salt, and an oligomer or polymer soluble in the aqueous salt solution. The oligomer or polymer includes a hydrophobic oligomeric or polymeric backbone made from the oligomerization or polymerization of alkene or alkyne monomer groups, or mixtures thereof. The oligomer or polymer further comprises surfactant functional groups attached to the hydrophobic backbone, wherein the oligomer or polymer is hydrophilic in the surfactant functional groups and hydrophobic in the backbone hydrocarbon chain. Thus the oligomer or polymer has a molecular structure that promotes the formation of micellar assemblies such that the oligomers or polymers develop viscoelastic character prior to a polymerization step.

The claimed subject matter also encompasses a method of drilling a subterranean well as well as other sues for the wellbore fluid that should be apparent to one of skill in the art.

Further details regarding the claimed subject matter can be found in the following description.

DESCRIPTION

The claimed subject matter relates to compositions for increasing the thermal durability of viscoelastic-surfactant-based well fluids. More specifically, the claimed subject matter relates to the fields of fluid rheology, thickeners, viscosifiers, viscoelastic fluids, viscoelastic surfactant fluids, drilling fluids, well fracturing fluids, well treatment fluids and fluid control pills. Further, the claimed subject matter relates to increasing the thermal and pressure stability of well fluids viscosified using viscoelastic surfactants by including an effective amount of a surfactant-oligomeric or surfactant-polymeric compound that has a thermally stable backbone structure and viscoelastic surfactant appendages. As the term is used in the present disclosure, "effective" simply means an amount sufficient to raise the temperature stability of the viscoelastic-surfactant based well fluid system by a measurable amount.

In accordance with one illustrative embodiment of the claimed subject matter, a sufficient quantity of at least one surfactant-oligomeric or surfactant-polymeric compound that is soluble in an aqueous salt solution is employed to affect the desired viscosity. In the claimed subject matter, the molecules of the surfactant-oligomeric or surfactant-polymeric compound have a hydrophobic oligomeric or polymeric backbone made preferably from the oligomerization or polymerization of alkene and/or alkyne groups. As the term is used herein, "thickener" and surfactant-oligomeric or surfactant-polymeric compound are used interchangeably and are intended to mean the compounds substantially described and claimed herein. The thickener of the claimed subject matter also includes chemical functional groups that are structurally similar to prior art viscoelastic surfactants and therefore these molecules exhibit similar chemical characteristics of prior art viscoelastic surfactants. Thus the hydrophobic backbone is chemically linked to and thus rendered at least in part hydrophilic by the presence of these chemical functional groups. One such illustrative compound is the product of the oligomerization reaction of a monomer such as the sodium salt of N-N-dimethyl-N-methylcarboxylate-N-1-hepten-7-ammonium chloride to give the sodium salt of oligo-(1-hepten-7-quaternary-ammonio-N-N-dimethyl-N-methylcarboxylate). The resulting oligomer is believed to have the simplified structure as indicated below:

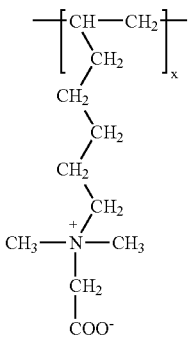

in which x will have a value from about 2 to several hundred thousand, preferably from about 2 to several dozen. The monomer may be prepared, for example, by the reaction of N-hexadecyl-N,N-dimethylamine with chloroacetic acid to produce N-hexadecyl-N-methylcarboxylic acid-N,N-dimethylammonium chloride. Upon neutralization with sodium hydroxide, the final product is the zwitterionic betaine which is the sodium salt of N-hexadecyl-N-carboxymethyl-N,N-dimethylammonium chloride—it has a negative charge on the carboxyl group and the sodium cation associated with it as a counter ion, and a positive charge on the quaternary amine group and the chloride anion associated with it as a counter ion. Alternatively, the sodium and chloride counter ions may be separated therefrom, leaving the negatively charged carboxyl group and the positively charged quaternary amine group as counter ions for each other.

The sodium salt of oligo-(1-hepten-7-quaternary-ammonio-N-N-dimethyl-N-methylcarboxylate) is an example of a salt of oligo- or poly-(α-alkenyl-ω-quaternary-ammonio-N-N-dialkyl-N-alkylcarboxylate). This example begins to define the terms α-alkenyl-ω- and α-alkynyl-ω-, wherein the "α-" designation denotes a location at or near one end of the hydrocarbyl chain, such as, for example at the 1-, 2-, or 3-position and wherein the "ω-"designation denotes a location at or near the opposite end of the hydrocarbyl chain from the α-position, such as, for example at the very end of the hydrocarbyl chain, at one carbon group away from the very end of the hydrocarbyl chain, or at two carbon groups away from the very end of the hydrocarbyl chain. An α-alkene and an α-alkyne are defined similarly. An α-alkenyl-ω-carboxylate salt and an α-alkynyl-ω-carboxylate salt are defined in a parallel manner. An α-alkenyl-ω-N,N,N-trialkylammonium salt and an α-alkynyl-ω-N,N,N-trialkylammonium salt are defined similarly. An α,α+2-alkadienyl-ω-carboxylate salt and an α,α+2-alkadiynyl-ω-carboxylate salt are defined in a parallel manner.

In one illustrative embodiment, a monomer like the sodium salt of N-carboxymethyl-N,N-dimethyl-N-1-hepten-7-ammonium chloride could be mixed into the solution of the conventional rod-shaped or spaghetti-like or spiraling-cylinder-like micelles of the viscoelastic surfactant that is the sodium salt of N-hexadecyl-N-carboxymethyl-N,N-dimethylammonium chloride. This illustrative, monomer, the sodium salt of N-carboxymethyl-N,N-dimethyl-N-1-hepten-7-ammonium chloride, differs only in minor ways from the sodium salt of N-hexadecyl-N-carboxymethyl-N,N-dimethylammonium chloride. Accordingly, the monomer will be readily subsumed into the conventional rod-shaped or spaghetti-like or spiraling-cylinder-like micelles, whereupon one can take well-known steps to initiate the oligomerization or polymerization of the monomer to produce the sodium salt of oligo- or poly-(1-hepten-7-quaternary-ammonio-N,N-dimethyl-N-methylcarboxylate). This oligomer or polymer will be inherently hydrophilic in its zwitterionic functional groups and hydrophobic in the hydrocarbon chains that link all the zwitterionic functional groups to each other. The oligomer or polymer is believed to be structurally quite similar to the viscoelastic surfactant molecules in the well fluid and therefore is soluble or dispersible in the well fluid solution. Similar oligomers or polymers are likewise soluble or dispersible in other viscoelastic surfactant solutions such as 10% XE862 (a product that is commercially available from Schlumberger) solution with 0.3% sodium dodecylbenzene sulfonate (SDBS) in 13.5 pound per barrel $CaBr_2$-based brine. Upon mixing the oligomer or polymer with the viscoelastic-surfactant-based fluid, the oligomer or polymer is believed to be subsumed into the rod-shaped or spaghetti-like micelles, whereupon, sitting inside these rod-shaped or spaghetti-like or spiraling-cylinder-like micelles is one or more such oligomer or polymer molecules and when configured in this fashion, the oligomer or polymer molecules impart greater thermal stability to the micelles, greater resistance to shear stress and other stress conditions acting upon a fluid loss pill—including, for example, exposure to oil, high shear in pumping and placement, high temperature, high differential pressure, and low pH.

Another illustrative embodiment of the compounds of the claimed subject matter includes the oligomeric or polymeric products of the co-oligomerization or co-polymerization of two different monomers such as 1-heptene and the sodium salt of N-carboxymethyl-N,N-dimethyl-N-1-hepten-7-ammonium chloride. Alternatively, 1-heptene can be first co-oligomerized or co-polymerized with N,N-dimethyl-1-hepten-7-amine and in a subsequent reaction the amine groups are reacted with 1-chloro-propane-3-sulfonic acid and then caustic to produce oligo- or poly-(1-heptene-co-1-hepten-7-quaternary-ammonio-N,N-dimethyl-N-propylsulfonate).

The resulting oligomer or polymer is believed to have the simplified structure as indicated below:

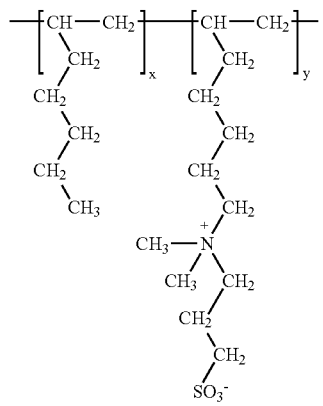

in which x and y will have values dependent upon the molar ratio of reactants added to the polymerization reaction and the sum of x and y will have a value of about 2 to several hundred thousand, preferably from about 2 to several dozen. While this oligomer or polymer will be inherently hydrophilic in its zwitterionic functional groups, there are two sources of hydrophobicity: in the 1-heptene co-oligomer or co-polymer species and in the hydrocarbon chains that link all the zwitterionic functional groups to each other. By varying the molar ratio of the monomers present during the oligomerization or polymerization reaction, the hydrophobicity and viscoelastic surfactant properties of the resulting oligomer or polymer may be controlled. The oligomer or polymer contains a point of structural similarity to the small molecule viscoelastic surfactants and therefore is soluble or dispersible in such conventional viscoelastic surfactant solutions. Similar oligomers or polymers are likewise soluble or dispersible in the 10% XE862 solution with 0.3% SDBS in 13.5 pounds per gallon $CaBr_2$-based brine discussed above. Upon admixing the polymer with the viscoelastic-surfactant-based fluid, the polymer is believed to be subsumed into the rod-shaped or spaghetti-like or spiraling-cylinder-like micelles, whereupon, sitting inside these rod-shaped or spaghetti-like or spiraling-cylinder-like micelles is one or more such polymer molecules and when configured in this fashion, the polymer molecules impart greater thermal stability to the micelles, greater resistance to shear stress and other stress conditions acting upon a fluid loss pill—including, for example, exposure to oil, high shear in pumping and placement, high differential pressure, and low pH.

Yet a third illustrative embodiment of the compounds of the claimed subject matter includes the co-oligomerization or co-polymerization of three or more co-monomers. For example, one could co-oligomerize or co-polymerize 1-heptene, 1-heptene-6,7-diol and N,N-dimethyl-1-hepten-7-amine. In such an illustrative embodiment, the amine groups are reacted with 1-chloro-propane-3-sulfonic acid and then caustic to produce oligo- or poly-(1-heptene-co-1-heptene-6,7-diol-co-1-hepten-7-quaternary-ammonio-N,N-dimethyl-N-propylsulfonate). The resulting oligomer or polymer is believed to have the simplified structure as indicated below:

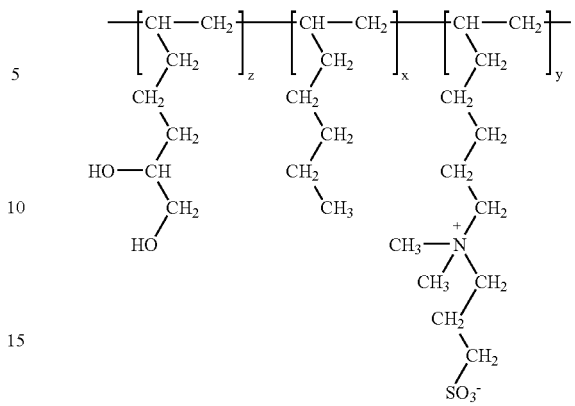

in which x, y and z will have values dependent upon the molar ratio of reactants added to the polymerization reaction and the sum of x, y, and z will have a value of about 3 to several hundred thousand, preferably from about 3 to several dozen. As with the other oligomers or polymers of the claimed subject matter, the above illustrative oligomer or polymer is soluble or dispersible in conventional viscoelastic surfactant well fluids such as the 10% XE862 solution with 0.3% SDBS in 13.5 pounds per gallon $CaBr_2$-based brine discussed above. Upon admixing the illustrative oligomer or polymer with such a viscoelastic-surfactant-based fluid, the oligomer or polymer is believed to be subsumed into the rod-shaped spaghetti-like or spiraling-cylinder-like micelles, whereupon, sitting inside these rod-shaped spaghetti-like or spiraling-cylinder-like micelles is one or more such oligomer or polymer molecules and when configured in this fashion, the oligomer or polymer molecules impart greater thermal stability to the micelles, greater resistance to shear stress and other stress conditions acting upon a fluid loss pill—including, for example, exposure to oil, high shear in pumping and placement, high differential pressure, and low pH. Additionally, the co-monomer 1-heptene-6,7-diol incorporates a vicinal diol functionality into the oligomer or polymer. Surface forces should cause the vicinal diol functionality to present itself at the outer surface of any rod-shaped micelle in which it has become subsumed.

The vicinal diol functionality provides the chemical functional group that renders the oligomers or polymers readily crosslinkable with polyvalent metal ions or complexes such as, for example, a borate, titanate, or zirconate crosslinker as taught in U.S. Pat. No. 5,062,969, (2) divalent, trivalent, or tetravalent cations such as, for example, $Fe^{2+}$, $Cd^{2+}$, $Co^{2+}$, $Ca^{2+}$, $Cu^{2+}$, $UO_2^{2+}$, $PbO^{2+}$, $Al^{3+}$, $Fe^{3+}$, $Cr^{3+}$, $Ce^{3+}$, $Ti^{4+}$, $Zr^{4+}$, $Sn^{4+}$, and the like, 3) complexes of or other moieties containing the crosslinkers listed above in the first two categories, such as, for example, the tetrammine complex of the $Cu^{2+}$ cation, the carbonate anion complexes of the $UO_2^{2+}$ cation, $UO_2(CO_3)_2^{2-}$ and $UO_2(CO_3)_3^{4-}$, or the triethanolamine complex of the $Ti^{4+}$ cation, (4) so-called "organic crosslinkers" such as, for example, formaldehyde, and glutaraldehyde, and (5) mixtures of the crosslinkers listed above in the first four categories and/or reaction products therefrom. Thus it is contemplated that one of skill in the art could, if desired, crosslink the illustrative oligomers or polymers with polyvalent metal ions, complexes, organic crosslinkers, or mixtures thereof, as described above. This is believed to lead effectively to the crosslinking of the viscoelastic surfactant assemblies in which the oligomers or polymers have been subsumed.

One of skill in the art should at this point appreciate that the co-oligomerization or co-polymerization reactions disclosed above result in the random placement of each co-monomer along the vinyl backbone of the illustrative oligomers or polymers. However, it is contemplated that block co-oligomerization or co-polymerization could also be used to achieve substantially similar results. Alternatively, block co-oligomerization or co-polymerization could also be used to carefully tailor the properties of the resulting oligomers or polymers made in accordance with the claimed subject matter. One of skill in the art should understand and appreciate that by systematically controlling the molar ratio of and concentration of monomers present in during the oligomerization or polymerization process, the order of addition, the temperature and duration of oligomerization or polymerzation and the initiators and catalysts used and their concentrations, the properties of the compounds of the claimed subject matter can be carefully controlled and tailored.

Other oligomers or polymers formulated in accordance with and illustrative of the claimed subject matter include such oligomers or polymers as oligo- or poly-(N-carboxymethyl-N,N-diallyl-N-methyl ammonium chloride), oligo- or poly-(N,N-diallyl-N,N-dimethyl ammonium chloride-co-N-carboxymethyl-N,N-diallyl-N-methyl ammonium chloride), oligo- or poly-(1-butene-co-N-carboxymethyl-N,N-diallyl-N-methyl ammonium chloride), oligo- or poly-(1-butene-co-1-pentene-4,5-diol-co-N-carboxymethyl-N,N-diallyl-N-methyl ammonium chloride), oligo- or poly-alkenyl or -alkynyl DMAPA amides (see Figure below), oligo- or poly-alkenyl or -alkynyl DMAPA quats, and oligo- or poly-alkenyl or -alkynyl tallow amine quaternary amines such as

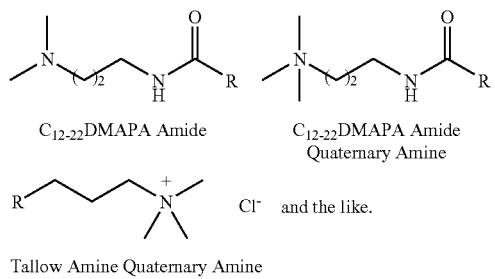

Except for the oligo- or poly-alkenyl or -alkynyl DMAPA amides, oligo- or poly-alkenyl or -alkynyl DMAPA quaternary amines, and oligo- or poly-alkenyl or -alkynyl tallow amine quaternary amines, oligomers or polymers of this type may be unlike those of the previous illustrative embodiments of the claimed subject matter in that they are probably not capable of effectively vacuuming up the micelles and packing them about themselves until there are enough surfactant molecules present in the vicinity of the oligomer or polymer molecule so that the spherical micelles can merge into a single rod-shaped or spaghetti-like or spiraling-cylinder-like micelles with the oligomer or polymer molecule subsumed within the rod-shaped or spaghetti-like or spiraling-cylinder-like micelles. Polymers or oligomers in accordance with the present illustrative embodiment of the claimed subject matter are designed to be compatible with $CaBr_2$—, $CaBr_2/CaCl_2$—, $ZnBr_2/CaBr_2$—, and $ZnBr_2/CaBr_2/CaCl_2$-based brines.

Other oligomers or polymers formulated in accordance with and illustrative of the claimed subject matter include oligomers or polymers such as oligo- or poly-(ethylene-co-N,N-diallyl-N,N-dimethyl ammonium chloride), oligo- or poly-(1-butene-co-N,N-diallyl-N,N-dimethyl ammonium chloride), oligo- or poly-(1-butene-co-1-pentene-4,5-diol-co-N,N-diallyl-N,N-dimethyl ammonium chloride), and the like. Polymers or oligomers of this type are probably not sufficiently compatible with $CaBr_2$—, $CaBr_2/CaCl_2$—, $ZnBr_2/CaBr_2$—, and $ZnBr_2/CaBr_2/CaCl_2$-based brines; however, they expand the scope of the claimed subject matter into useful dimensions to the extent that these polymers should be quite compatible with NaCl—, NaBr—, NaBr/NaCl—, CsBr/KBr—, and CsBr/KBr/NaCl-based brines and the like. Poly- or oligo-(1-butene-co-1-pentene-4,5-diol-co-N,N-diallyl-N,N-dimethyl ammonium chloride) incorporates a vicinal diol functionality, and so one of skill in the art should appreciate that this polymer or oligomer may be crosslinkable with polyvalent metal ions as disclosed above. As noted above, when the oligomers or polymers are crosslinked with polyvalent metal ions, we also effectively crosslink the viscoelastic surfactant assemblies in which the oligomers or polymers have been subsumed.

Additional embodiments of the claimed subject matter include zwitterionic surfactant heads such that the polymers or oligomers have the following structures:

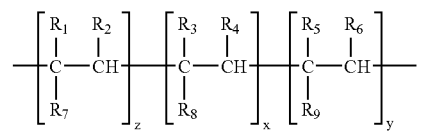

in which $R_1, R_2, R_3, R_4, R_5, R_6 =$ H or $CH_3$

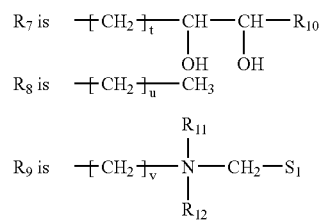

and in which $R_{10}, R_{11}, R_{12} =$ H or $CH_3$, and t=1 to 16, u=6 to 12, v=1 to 18, w=1 to 3, and x+y+z=3 to 300,000 and $S_1 = CO_2^-$ or $SO_3^-$. In a preferred illustrative embodiment, t=12 to 16, u=6 to 12; v=12 to 18, w=1 to 3, x=0 to 10,000, y=2 to 300,000 and z=0 to 10,000

Alternatively the oligomer or polymer compound can be cationic in the surfactant head and thus have a structure such as:

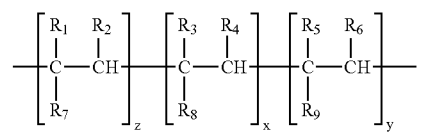

in which $R_1, R_2, R_3, R_4, R_5, R_6 =$ H or $CH_3$

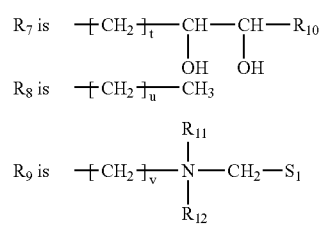

and in which $R_{10}$, $R_{11}$, $R_{12}$=H or $CH_3$, t=1 to 16, u=6 to 12, v=1 to 18, and x+y+z=3 to 300,000. An especially preferred and illustrative embodiment includes an oligomer or polymer in which t=12 to 16, u=6 to 12, v=12 to 18, w=1 to 3, and x=0 to 10,000, y=2 to 300,000, and z=0 to 10,000.

In yet another illustrative embodiment, the oligomer or polymer can have a molecular structure that includes an anionic surfactant functional group such as:

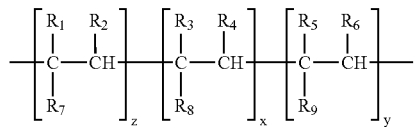

where $R_1$, $R_2$, $R_3$, $R_4$, $R_5$, $R_6$=H or $CH_3$

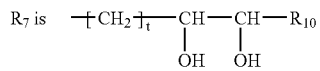

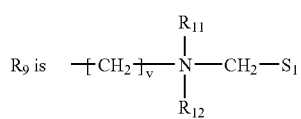

in which $R_{10}$, $R_{11}$, $R_{12}$=H or $CH_3$, t=1 to 16, u=6 to 12, v=1 to 18, x+y+z=3 to 300,000, and $S_1$=$CO_2^-$ or $SO_3^-$. In one such illustrative embodiment, it is preferred that t=12 to 16, u=6 to 12, v=12 to 18, x=0 to 10,000, y=2 to 300,000, and z=0 to 10,000.

Further as noted above, the illustrative oligomer or polymer can have a nonionic surfactant group and preferably has a molecular structure such as:

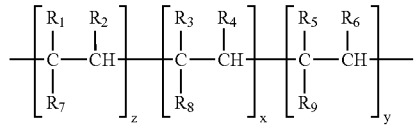

in which $R_1$, $R_2$, $R_3$, $R_4$, $R_5$, $R_6$=H or $CH_3$

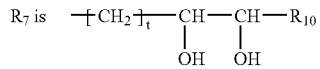

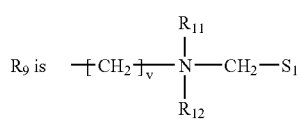

and in which, $R_{10}$, $R_{11}$, $R_{12}$=H or $CH_3$, t=1 to 16, u=6 to 12, v=1 to 18, $S_1$=$CO_2^-$ or $SO_3^-$, and x+y+z=3 to 300,000. In such instances, a preferred illustrative embodiment is achieved when t=12 to 16, u=6 to 12, v=12 to 18, and x=0 to 10,000, y=2 to 300,000 and z=0 to 10,000.

Fundementally the polymeric backbone can be saturated as noted in the above illustrative examples or unsaturated. In such illustrative embodiments, the oligomer or polymer has a back bone structure such as the following:

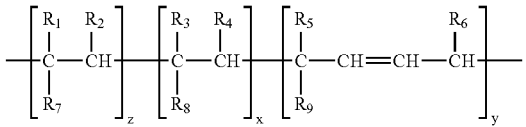

in which $R_1$, $R_2$, $R_3$, $R_4$, $R_5$, $R_6$=H or $CH_3$. As for the $R_7$, $R_8$ and $R_9$ groups, these may be the same as those disclosed above. Thus one of skill in the art should appreciate that zwitterionic, cationic, anionic and nonionic surfactant groups may be attached to the unsaturated backbone structure shown above and that such compounds are illustrative of the disclosed and claimed subject matter.

As discussed above, the novel oligomers and polymers taught in accordance with the claimed subject matter contain chemical functional groups that are similar to those found in conventional viscoelastic surfactants and thus are highly compatible with conventional viscoelastic surfactant systems. Accordingly, the claimed subject matter teaches blends of the viscoelastic oligomers or polymers with conventional viscoelastic surfactant systems. The conventional viscoelastic-surfactant-based fluids useful for the claimed subject matter are those in the following references, all of which are incorporated herein by reference—Canadian Patent 1,298,697, U.S. Pat. Nos. 4,615,825, 4,695,389, 4,725,372, 5,258,137, 5,551,516, 5,691,292, 5,964,295, 5,965,502, 5,979,555, 5,979,557, 6,140,277, 6,194,355, 6,194,356, 6,211,120, 6,232,274, 6,239,183, Paper SPE 17,168, Paper SPE 30,098, Paper SPE 30,114, Paper SPE 30,458, Paper SPE 31,114, Paper SPE 38,622, Paper SPE 56,467, Paper SPE 57,432, Paper SPE 59,478, and Paper SPE 60,322. Of these, the preferred viscoelastic-surfactant-based fluids are those based on anionic, cationic, or zwitterionic surfactants or mixtures of anionic and nonionic surfactants or mixtures of cationic and nonionic surfactants or mixtures of zwitterionic and nonionic surfactants. And of these, the particularly preferred viscoelastic-surfactant-based fluids are those based on zwitterionic surfactants or mixtures of zwitterionic and nonionic surfactants. In both the preferred viscoelastic-surfactant-based fluids, and in the particularly preferred viscoelastic-surfactant-based fluids, a minority amount of an additional surfactant, termed a "co-surfactant", such as, for example, 2-ethylhexanol or SDBS may optionally be employed. The viscoelastic oligomers or polymers of the claimed subject matter may be created in the presence of conventional viscoelastic surfactant systems or may be synthesized in separate steps, optionally processed or dried, and then subsequently admixed into a solution of conventional viscoelastic surfactants.

The aqueous well fluids made in accordance with the claimed subject matter may optionally include a sufficient quantity of at least one water-soluble inorganic salt to effect formation stability. Typically, water-soluble potassium and ammonium salts, such as potassium chloride and ammonium chloride are employed. However, other shale inhibition compounds may be utilized including organic amine based compounds and other known shale inhibition agents. Additionally, calcium chloride, calcium bromide and zinc halide salts may also be used to increase the specific gravity (i.e., the density) of the solution. Formation stability and in particular clay stability are achieved at a concentration of a few percent by weight and as such the density of the fluid is not significantly altered by the presence of the inorganic salt unless fluid density becomes an important consideration, at which point, heavier inorganic salts may be employed.

Other compounds useful in the claimed subject matter include other viscosifiers, corrosion inhibitors, lubricants, pH control additives, surfactants, solvents, and/or weighting agents, among other additives. Some typical brine-based well fluid viscosifying additives include "natural" or biopolymers or derivatives thereof, such as, for example, xanthan gum and hydroxyethyl cellulose (HEC) or synthetic polymers and oligomers such as poly(ethylene glycol) (PEG), poly(diallyl amine), poly(acrylamide), poly(aminomethylpropylsulfonate [AMPS]), poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam) and co-, ter-, and quater-polymers of the following co-monomers: ethylene, butadiene, isoprene, styrene, divinylbenzene, divinyl amine, 1,4-pentadiene-3-one(divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam. Yet other viscosifiers include the clay-based viscosifiers, especially laponite and other small fibrous clays such as the polygorskites (attapulgite and sepiolite).

One of ordinary skill in the art should appreciate that the use of "inert" filler materials can be added to impart strength to a fluid. Examples of such materials include shredded rubber tires, shredded battery casings, peanut hulls, cotton seed hulls, woody material, and other plant fibers that should be well known to one of skill in the art.

Additional brine-based well fluid surfactant additives useful in the claimed subject matter include nonionic surfactants, such as ethoxylated nonylphenols containing about 6 to 20 moles of ethylene oxide, or alkyl polyethyleneoxyalcohols, ethoxylated linear alcohols, ethoxylated tridecyl alcohols, ethoxylated phenols such as nonylphenols and dodecylphenols and fatty dialkanol amides. Hydroxyethyl fatty amines are also classified as nonionic surfactants, although at low pH, they may take on some cationic character. Emulsifying surfactants including oil soluble surfactants, such as fatty diethanolamides, sorbitan fatty acid esters, and ethoxylated sorbitan fatty acid esters such as sorbitan monooleate and sorbitan sesqioleate, because of their limited solubility in typical brines, may however be incidentally included in the formulation of other products—polymer solutions, emulsions, or slurries, corrosion inhibitors, lubricants, solvents, or weighting agents—that are used as additives to brine-based well fluids.

Other surfactants useful in the claimed subject matter are those listed in "McCutcheon's Emulsifiers and Detergents 1999: North American Edition" (ISBN: 0944254624), incorporated herein by reference. They are classified as anionic, nonionic, amphoteric, zwitterionic, alcohols, alkanolamides, alkanolamines, alkylaryl sulfonates, alkylaryl sulfonic acids, amine acetates, amine oxides, amines, sulfonated amines, sulfonated amides, betaine derivatives, block polymers, carboxylated alcohols, alkylphenol ethoxylates, carboxylic acids, fatty acids, ethoxylated alcohols, ethoxylated alkylphenols, ethoxylated amines, ethoxylated amides, ethoxylated fatty acids, ethoxylated fatty esters, fatty esters, fluorocarbon-based surfactants, glycerol esters, glycol esters, heterocyclic surfactants, imidazolines, imidazoline derivatives, isethionates, lanolin-based derivatives, lechithin, lechithin derivatives, methyl esters, monoglycerides, monoglyceride derivatives, olefin sulfonates, phosphate esters, phosphorous organic derivatives, polyethylene glycols, polymeric surfactants (polysaccharides, polyacrylic acids, polyacrylamides), propoxylated alcohols, propoxylated alkylphenols, propoxylated amines, propoxylated amides, propoxylated fatty acids, propoxylated fatty esters, protein-based surfactants, quaternary surfactants, sarcosamine derivatives, silicone-based surfactants, soaps, sodium isethionate, sorbitan derivatives, sucrose and glucose esters and derivatives, sulfates and sulfonates of oils and fatty acids, sulfates and sulfonates of ethoxylated alkylphenols, sulfates of alcohols, sulfates of ethoxylated alcohols, sulfates of fatty esters, sulfonates of hydrocarbons and petroleum, sulfosuccinates and derivatives, taurates, thio and mercapto derivatives, and tridecyl and dodecyl benzene sulfonic acids.

As mentioned earlier, the claimed subject matter concentrates on those micellar assemblies that are dominated by (1) one-dimensional extensions of the spherical micelle into rod-shaped or spaghetti-like or spiraling-cylinder-like micelles, (2) two-dimensional extensions of the spherical micelle into planar micelles or, more likely, stacks of planar micelles (as in liquid crystals), or (3) vesicular micelles. Vesicular micelles may be spherical at their very centers, but each center sphere will be surrounded by a second, third, and possibly more layers of surfactants. Moving outward radially from the central sphere of surfactant molecules, each successively outer layer of surfactant molecules will be oriented oppositely from next inner-most layer. Vesicular micelles may also be rod-shaped at their very centers, but each central rod-shaped assembly will be surrounded by a second, third, and possibly more layers of surfactants. A stack of planar micelles may be thought of as the vesicular form of a single planar micelle. These concepts comprise yet another illustrative embodiment of the claimed subject matter.

The above-mentioned embodiments may also comprise oligomers or polymers created by first carrying out a micellar polymerization to produce an oligomer or polymer, and then optionally processing or drying the product, and then subsequently admixing it into a solution of conventional surfactants—(1) non-viscoelastic or (2) non-viscoelastic and viscoelastic in nature. The micelles of the conventional surfactants would, in preferred instances, subsume the oligomers or polymers into the conventional surfactant micelles to create mixed micelles having superior viscoelastic properties in comparison to those of equivalent solutions not comprising the conventional surfactants and/or in comparison to those of equivalent solutions not comprising the oligomers or polymers.

It should also be appreciated by one of skill in the art that the claimed subject matter also relates to methods of using fluid loss control pills and similar fluids containing the compounds of the claimed subject matter, that can sustain stress conditions for extended periods of time without significant fluid loss or loss of desirable rheological properties. The stress conditions may include, for example, exposure to oil, high shear in pumping and placement, exposure to oxidizing breakers (including oxygen dissolved in the fluid), exposure to brines having high divalent cation content, high temperature, high differential pressure, low pH, extended time, and a combination of two or more of such stress conditions. These pills and fluids are advantageously applied in or in connection with drilling, drill-in, displacement, completion, hydraulic fracturing, work-over, packer fluid emplacement or maintenance, well treating, testing, or abandonment.

Exemplary viscoelastic surfactant compositions of improved stability in fluid loss control in accordance with the claimed subject matter are given in the following examples. The following examples are included to demonstrate preferred embodiments of the claimed subject matter. It should be appreciated by those of skill in the art that the techniques disclosed in the examples which follow represent techniques discovered by the inventors to function well in the practice of the claimed subject matter, and thus can be considered to constitute preferred modes for its practice. However, those of skill in the art should, in light of the present disclosure, appreciate that many changes can be made in the specific embodiments which are disclosed and still obtain a like or similar result without departing from the scope of the claimed subject matter.

EXAMPLE 1

The oligomerization of the surfactant N-dodecene-1-yl-N, N-bis(2-hydroxyethyl)-N-methylammonium chloride:

in an aqueous solution was achieved by joining a few of the carbon-carbon double bonds by a free radical oligomerization reaction within the micelles using the following processes. A viscoelastic surfactant solution is produced using 30 g/l of the surfactant N-dodecene-1-yl-N,N-bis(2-hydroxyethyl)-N-methylammonium chloride with 40 g/l ammonium chloride. A volume of 100 ml of the viscoelastic surfactant solution was placed in a bottle purged with oxygen-free, dry nitrogen gas to remove any dissolved oxygen. After sufficient purging 10 mg of the free radical initiator 2,2'-azo(bis-amidinopropane)dihydrochloride was added to the viscoelastic surfactant solution and mixed thoroughly. The surfactant solution was heated at 60° C. for 30 minutes under an atmosphere of oxygen-free, dry nitrogen. The resulting oligomer can be thought of as related to oligo-ethylene, a relatively short-chained polyethylene, to which relatively long pendant surfactant groups —$[(CH_2)_{18}][HO(CH_2)_2]_2CH_3N^+Cl^-$— are linked. Oligomerization of the surfactant monomers in micelles resulted in the viscosity of the gel becoming largely insensitive to contact with hydrocarbon. The viscosity of the surfactant gel was not materially altered by the oligomerization of the surfactant monomers. The oligomerized surfactant gel retained its gel strength after prolonged contact with water. A volume of 50 ml of the oligomerized viscoelastic surfactant solution was blended with 50 ml of the original un-oligomerized viscoelastic surfactant solution. The resulting solution was blended with 8 volume % of n-hexane with no material reduction in the viscosity of the mixture being observed, whereas mixing only 6 volume % of n-hexane with the original un-oligomerized viscoelastic surfactant solution led to loss of essentially all viscosity in the mixture. Advantageously, therefore, compositions formed in accordance with the claimed subject matter provide viscoelastic surfactant fluids that are capable of controlling fluid loss, and that are capable of dissolving in fluid without leaving substantial amounts of residue. Further, the compositions are capable of controlling fluid loss at temperatures up to about 350° F. or higher, and may also control fluid loss for an extended period of at least 4 days, and finally, do not interfere with other chemical additives commonly used in the petroleum industry.

EXAMPLE 2

The oligomerization of the surfactant potassium octadec-1-ene-18-oate:

in an aqueous solution was achieved using the following processes. The viscoelastic surfactant solution was formed by mixing 60 g/l potassium oleate with 60 g/l potassium chloride. A sample of 100 ml of the viscoelastic surfactant solution was purged with oxygen-free, dry nitrogen and mixed with 10 mg of the initiator 2,2'-azo(bisamidinopropane)dihydrochloride. The solution is heated at 60° C. for 30 minutes under an atmosphere of oxygen-free, dry nitrogen. The resulting solution of oligomerized surfactants was about equally viscoelastic as the original monomeric solution but the observed viscoelasticity was insensitive to contact with hydrocarbon. The resulting oligomer can be thought of as related to oligo-ethylene, a relatively short-chained polyethylene, to which relatively long pendant groups —$(CH_2)_{16}CO_2^-K^+$— are linked. The gel formed by the oligomerized surfactant retained its viscoelasticity after prolonged contact with water. The observations led to the conclusion that the oligomer was viscoelastic in character, much as was the original un-oligomerized viscoelastic surfactant solution; but the oligomerized solution was more stable than the original un-oligomerized solution.

EXAMPLE 3

The oligomerization of a long-chain vinyl surfactant, the potassium salt of octadeca-1,3-diene-17-oate:

in a viscoelastic solution was carried out at a concentration of 60 g/l in the presence of 40 g/l ammonium chloride. The surfactant monomers were oligomerized using 10 mg of the free radical initiator 2,2'-azo(bis-amidinopropane) dihydrochloride in 100 ml of viscoelastic surfactant solution which had been purged with oxygen-free, dry nitrogen gas. The solution was heated at 60° C. for 30 minutes under an atmosphere of oxygen-free, dry nitrogen. The resulting oligomer can be thought of as related to oligo-butadiene, a relatively short-chained polybutadiene, to which relatively long pendant groups —$(CH_2)_{14}CO_2^-K^+$— are linked. Oligomerization of the surfactant resulted in a semi-rigid gel that retained the viscoelasticity of the original monomeric surfactant solution but showed none of its sensitivity to contact with hydrocarbon or water. The observations led to the conclusion that the oligomer was viscoelastic in character, much as was the original un-oligomerized viscoelastic surfactant solution; but the oligomerized solution was more stable than the original un-oligomerized solution.

EXAMPLE 4

Oligomers of N-(undec-11-enyl)-N,N-dimethylammonium chloride were synthesized by linking the head groups with a branched $C_9$ bridge. First, 5-methylnonane-1,8-diamine was reacted with 11-chloroundec-1-ene, $CH_2=CH(CH_2)_9Cl$, and subsequently quaternized to produce the following monomer:

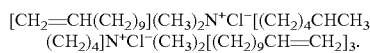

When this monomer was oligomerized, the product was a surfactant oligomer in which the $N^+Cl^-$ head groups, again, are almost completely free relative to their neighboring $N^+Cl^-$ head groups—each being linked to each other through relatively long $(CH_2)_4CHCH_3(CH_2)_4$ chains or to the oligo-ethylene backbone through relatively long pendant $(CH_2)_9$ chains.

The preparation of the monomer described above began with 5-methylnonane-1,8-diamine. This precursor was reacted with 11-chloroundec-1-ene, $CH_2=CH(CH_2)_9Cl$, under conditions such that each diamine group was be converted to secondary amines. In this first step in the synthesis, incompletely reacted material was separated from the di-secondary amine by distillation. The small part of the 5-methylnonane-1,8-diamine that had reacted too much and had become tertiarized or quaternized at one or both ends by excessive reaction with the 11-chloroundec-1-ene were separated by fractional crystallization from the desired N,N'-di-(1-decenyl)-5-methylnonane-1,8-diamine. Finally, this product was then reacted with an excess of methylbromide and quaternized to produce the monomer stated above. The oligomerization of this monomer:

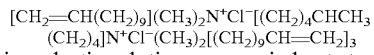
[CH$_2$=CH(CH$_2$)$_9$](CH$_3$)$_2$N$^+$Cl$^-$[(CH$_2$)$_4$CHCH$_3$ (CH$_2$)$_4$]N$^+$Cl$^-$(CH$_3$)$_2$[(CH$_2$)$_9$CH=CH$_2$]$_3$ in a viscoelastic solution was carried out at a concentration of 60 g/l in the presence of 40 g/l ammonium chloride. A volume of 100 ml of the viscoelastic surfactant solution was placed in a bottle purged with oxygen-free, dry nitrogen gas to remove any dissolved oxygen. After sufficient purging 10 mg of the free radical initiator 2,2'-azo(bis-amidinopropane)dihydrochloride was added to the viscoelastic surfactant solution and mixed thoroughly. The surfactant solution was heated at 60° C. for 30 minutes under an atmosphere of oxygen-free, dry nitrogen. Oligomerization of the surfactant monomers in micelles resulted in the viscosity of the gel becoming largely insensitive to contact with hydrocarbon. The viscosity of the surfactant gel was not materially altered by the oligomerization of the surfactant monomers. The oligomerized surfactant gel retained its gel strength after prolonged contact with water. The observations led to the conclusion that the oligomer was viscoelastic in character, much as was the original un-oligomerized viscoelastic surfactant solution; but the oligomerized solution was more stable than the original un-oligomerized solution.

EXAMPLE 5

The oligomerization of the viscoelastic surfactant monomer, the sodium salt of N-N-dimethyl-N-methylcarboxylate-N-1-hepten-7-ammonium chloride, was carried out to give oligo(1-hepten-7-quaternary-ammonio-N-N-dimethyl-N-methylcarboxylate), sodium salt. The resulting oligomer is believed to have the simplified structure as indicated below in the acid form rather than the sodium-salt form:

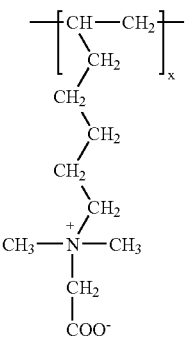

in which x will have a value from about 2 to several hundred thousand, preferably from about 2 to several dozen, and more preferably from about 2 to perhaps 4. The monomer was prepared by the reaction of N-1-hept-6-enyl-N,N-dimethylamine with chloroacetic acid to produce N-1-hept-6-enyl-N-methylcarboxylic acid-N,N-dimethylammonium chloride. Upon neutralization with sodium hydroxide, the final product was the zwitterionic betaine which is the sodium salt of N-hexadecyl-N-carboxymethyl-N,N-dimethylammonium chloride—it has a negative charge on the carboxyl group and the sodium cation associated with it as a counter ion, and a positive charge on the quaternary amine group and the chloride anion associated with it as a counter ion.

EXAMPLE 6

The viscoelastic monomer, the sodium salt of N-carboxymethyl-N,N-dimethyl-N-1-hepten-7-ammonium chloride was mixed into the solution of the conventional rod-shaped or spaghetti-like or spiraling-cylinder-like micelles of the viscoelastic surfactant that is the sodium salt of N-hexadecyl-N-carboxymethyl-N,N-dimethylammonium chloride. This illustrative monomer, the sodium salt of N-carboxymethyl-N,N-dimethyl-N-1-hepten-6-ammonium chloride, differs only in minor ways from the sodium salt of N-hexadecyl-N-carboxymethyl-N,N-dimethylammonium chloride. Accordingly, the monomer was readily subsumed into the conventional rod-shaped or spaghetti-like micelles, whereupon oligomerization was initiated to produce the sodium salt of oligo-(1-hepten-7-quaternary-ammonio-N,N-dimethyl-N-methylcarboxylate). This oligomer is inherently hydrophilic in its zwitterionic functional groups and hydrophobic in the hydrocarbon chains that link all the zwitterionic functional groups to each other. The oligomer is believed to be structurally quite similar to the viscoelastic surfactant molecules in the well fluid and therefore is readily soluble in the well fluid solution. the oligomers are likewise soluble or dispersible in other viscoelastic surfactant solutions such as 10% XE862 (a product that is commercially available from Schlumberger) solution with 0.3% SDBS in 13.5 pound per barrel CaBr$_2$-based brine. Upon mixing the oligomer or polymer with the viscoelastic-surfactant-based fluid, the oligomer or polymer is believed to be subsumed into the rod-shaped or spaghetti-like or spiraling-cylinder-like micelles, whereupon, sitting inside these rod-shaped or spaghetti-like or spiraling-cylinder-like micelles is one or more such oligomer or polymer molecules and when configured in this fashion, the oligomer or polymer molecules impart greater thermal stability to the micelles, greater resistance to shear stress and other stress conditions acting upon a fluid loss pill—including, for example, exposure to oil, high shear in pumping and placement, high temperature, high differential pressure, and low pH.

EXAMPLE 7

In another illustrative embodiment of the claimed subject matter, a sufficient quantity, about 10 volume %, of the co-monomer 1-heptene was mixed into a viscoelastic solution of the sodium salt of 1-hepten-7-quaternary-ammonio-N,N-dimethyl-N-propylsulfonate chloride, causing the solution to lose most or all of its viscoelastic character. Then the 1-heptene was co-oligomerized with the sodium salt of 1-hepten-7-quaternary-ammonio-N,N-dimethyl-N-propylsulfonate chloride to produce oligo-(1-heptene-co-1-hepten-7-quaternary-ammonio-N,N-dimethyl-N-propylsulfonate). The resulting oligomer is believed to have the simplified structure as indicated below:

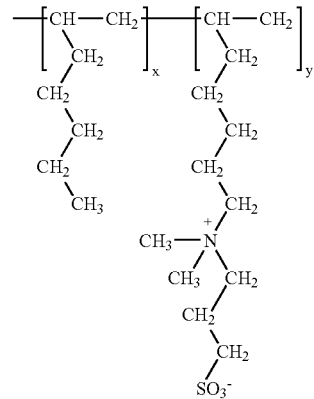

in which x and y will have values dependent upon the molar ratio of reactants added to the oligomerization reaction and the sum of x and y will have a value of about 2 to several hundred thousand, preferably from about 2 to several dozen, and more preferably from about 2 to ten. While this oligomer is inherently hydrophilic in its zwitterionic functional groups, there are two sources of hydrophobicity: in the 1-heptene copolymer species and in the hydrocarbon chains that link all the zwitterionic functional groups to each other. By varying the molar ratio of the monomers present during the polymerization reaction, the hydrophobicity and viscoelastic surfactant properties of the resulting oligomer and polymer may be controlled. The oligomer contains a point of structural similarity to the small molecule viscoelastic surfactants and therefore is readily soluble in such conventional viscoelastic surfactant solutions as the 10% XE862 solution with 0.3% SDBS in 13.5 pounds per gallon $CaBr_2$-based brine discussed above. Upon admixing the oligomer with the viscoelastic-surfactant-based fluid, the oligomer is believed to be subsumed into the rod-shaped or spaghetti-like or spiraling-cylinder-like micelles, whereupon, sitting inside these rod-shaped or spaghetti-like or spiraling-cylinder-like micelles is one or more such oligomer molecules and when configured in this fashion, the oligomer molecules impart greater thermal stability to the micelles, greater resistance to shear stress and other stress conditions acting upon a fluid loss pill—including, for example, exposure to oil, high shear in pumping and placement, high temperature, high differential pressure, and low pH.

EXAMPLE 8

In another illustrative embodiment of the claimed subject matter, a sufficient quantity, about 8 volume %, of the co-monomer 1-heptene was mixed into a viscoelastic solution of 1-heptene-6,7-diol and the sodium salt of 1-hepten-7-quaternary-ammonio-N,N-dimethyl-N-propylsulfonate chloride, causing the solution to lose most or all of its viscoelastic character. The resulting oligomer, oligo-(1-heptene-co-1-heptene-6,7-diol-co-1-hepten-7-quaternary-ammonio-N,N-dimethyl-N-propylsulfonate), is believed to have the simplified structure as indicated below:

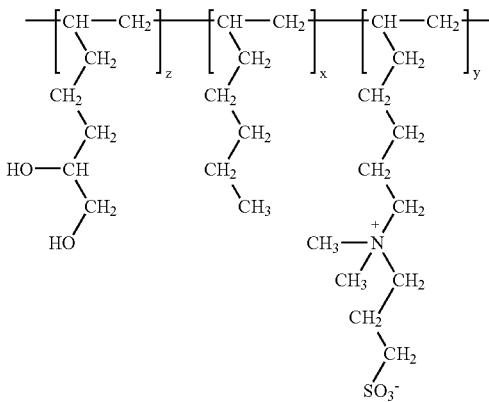

in which x, y and z will have values dependent upon the molar ratio of reactants added to the oligomerization reaction and the sum of x, y, and z will have a value of about 3 to several hundred thousand, preferably from about 3 to several dozen, and more preferably from about 3 to ten. As with the other polymers of the claimed subject matter, the above illustrative polymer is soluble in conventional viscoelastic surfactant well fluids such as the 10% XE862 solution with 0.3% SDBS in 13.5 pounds per gallon $CaBr_2$-based brine discussed above. Upon admixing the illustrative polymer with such a viscoelastic-surfactant-based fluid, the polymer is believed to be subsumed into the rod-shaped or spaghetti-like or spiraling-cylinder-like micelles, whereupon, sitting inside these rod-shaped or spaghetti-like or spiraling-cylinder-like micelles is one or more such polymer molecules and when configured in this fashion, the polymer molecules impart greater thermal stability to the micelles, greater resistance to shear stress and other stress conditions acting upon a fluid loss pill—including, for example, exposure to high shear in pumping and placement, high temperature, high differential pressure, and low pH. Additionally, the co-monomer 1-heptene-6,7-diol incorporates a vicinal diol functionality into the polymer. Surface forces should cause the vicinal diol functionality to present itself at the outer surface of any rod-shaped micelle in which it has become subsumed. The vicinal diol functionality was subsequently crosslinked with borate, leading effectively to the crosslinking of the viscoelastic surfactant assemblies in which the oligomers had been subsumed.

As discussed above, the novel oligomers or polymers taught in accordance with the claimed subject matter contain chemical functional groups that are similar to those found in conventional viscoelastic surfactants and thus are highly compatible with conventional viscoelastic surfactant systems. Accordingly, the claimed subject matter teaches blends of the viscoelastic oligomers or polymers with conventional viscoelastic surfactant systems. The viscoelastic-surfactant-based fluids useful for the claimed subject matter are those in the following citations, all of which are incorporated herein by reference—Canadian Patent 1,298,697, U.S. Pat. Nos. 4,615,825, 4,695,389, 4,725,372, 5,258,137, 5,551,516, 5,691,292, 5,964,295, 5,965,502, 5,979,555, 5,979,557, 6,140,277, 6,194,355, 6,194,356, 6,211,120, 6,232,274, 6,239,183, Paper SPE 17,168, Paper SPE 30,098, Paper SPE 30,114, Paper SPE 30,458, Paper SPE 31,114, Paper SPE 38,622, Paper SPE 56,467, Paper SPE 57,432, Paper SPE 59,478, and Paper SPE 60,322.

Furthermore, the oligomeric or polymeric viscoelastic surfactants may be added to a well fluid in substantially any convenient manner. Thus, the oligomeric or polymeric viscoelastic surfactants may be added directly to the well fluid either in solid form or in the form of an aqueous solution. Alternatively, the oligomeric or polymeric viscoelastic surfactants may be separately added to a solution already containing other surfactants or viscoelastic surfactants to provide a fluid loss controlling base solution, with the optional crosslinking agents thereafter being added to the fluid loss controlling base solution immediately prior to use.

In preferred embodiments, the oligomeric or polymeric viscoelastic surfactants, including optional crosslinking agents, are supplied to the well fluid at a level of about 20 ppm to about 20 parts per 100 parts of the well fluid, more preferably about 100 ppm to about 15 parts per 100 parts of the well fluid.

In more preferred embodiments, the oligomeric or polymeric viscoelastic surfactants, including optional crosslinking agents, are supplied to the well fluid already containing an amount of other surfactants or viscoelastic surfactants. When these more preferred embodiments are exercised, the oligomeric or polymeric viscoelastic surfactants are supplied at a level of about 20 ppmw to about 10 parts per 100 parts of the well fluid, preferably about 100 ppmw to about 5 parts per 100 parts of the well fluid.

Techniques for measuring fluid loss control are well known in the art and should be well known to one of skill and knowledge of the formulation of drilling fluids. Specifically, the fluid loss measurements of the present disclosure were made with reference to API Recommended Practice RP 13B-1, Second Edition, September 1997, pp. 9-11, the contents of which are incorporated by reference.

While the apparatus, compositions and methods of the claimed subject matter have been described in terms of preferred or illustrative embodiments, it will be apparent to those of skill in the art that variations may be applied to the process described herein without departing from the concept and scope of the claimed subject matter. All such similar substitutes and modifications apparent to those skilled in the art are deemed to be within the scope and concept of the claimed subject matter.

What is claimed is:

1. A wellbore fluid comprising:
an aqueous based continuous phase;
a viscoelastic surfactant; and
a surfactant-polymer compound soluble in an aqueous solution, the surfactant-polymer compound having a hydrophobic backbone and a plurality of hydrophilic functional groups attached to the hydrophobic backbone,
wherein the hydrophobic backbone is the reaction product of one or more molecules having polymerizable alkene or alkyne functional groups;
wherein the hydrophilic functional groups are selected from the group consisting of zwitterionic surfactant functional groups, anionic surfactant functional groups, cationic surfactant functional groups, and nonionic surfactant functional groups; and
wherein the combination of the viscoelastic surfactant and surfactant-polymer compound form micellar assemblies.

2. The wellbore fluid of claim 1 wherein the surfactant-polymer compound is a salt of oligo- or poly-(α-alkenyl-ω- or α-alkynyl-ω-quaternary-ammonio-N-N-dialkyl-N-alkylcarboxylate) or a mixture further comprising a salt of N-alkyl-N-carboxymethyl-N,N-dimethylammonium chloride.

3. The wellbore fluid of claim 2 wherein the surfactant-polymer compound is a salt of oligo- or poly-(α-alkenyl-ω- or α-alkynyl-ω-quaternary-ammonio-N,N-dialkyl-N-alkylcarboxylate).

4. The wellbore fluid of claim 3 wherein the surfactant-polymer compound is a salt of oligo- or poly-(1-hepten-7-quaternary-ammonio-N,N-dimethyl-N-methylcarboxylate).

5. The wellbore fluid of claim 4 wherein the acid form of the surfactant-polymer compound has the structure:

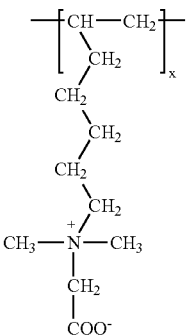

wherein x=2 to 300,000.

6. The wellbore fluid of claim 5 wherein x=2 to 36.

7. The wellbore fluid of claim 2 wherein the surfactant-polymer compound is a salt of oligo- or poly-(1-hepten-7-quaternary-ammonio-N,N-dimethyl-N-methylcarboxylate) or a mixture further comprising a salt of N-hexadecyl-N-carboxymethyl-N,N-dimethylammonium chloride.

8. The wellbore fluid of claim 1 further comprising a water-soluble inorganic salt.

9. A method of drilling a subterranean well, the method comprising:
drilling the subterranean well using a rotary drilling rig and circulating a drilling fluid in the subterranean well, wherein the drilling fluid is the wellbore fluid of claim 1.

10. A method of reducing the loss of fluid out of a subterranean well, the method comprising injecting into the subterranean well a wellbore fluid as recited in claim 1.

11. A wellbore fluid comprising:
an aqueous fluid;
a viscoelastic surfactant;
a thickener soluble in the aqueous fluid,
wherein the thickener has a hydrophobic oligomeric or polymeric backbone made from the reaction of alkene monomer or alkyne monomer, or mixtures thereof, and
wherein surfactant functional groups are attached to the hydrophobic backbone, wherein the surfactant functional group is selected from the group consisting of zwitterionic surfactant functional groups, anionic surfactant functional groups, cationic surfactant functional groups, and nonionic surfactant functional groups;
wherein the thickener has a molecular conformation such that the surfactant functional groups are hydrophilic and the hydrophobic oligomeric or polymeric backbone is hydrophobic; and
wherein the combination of viscoelastic surfactant and thickener form micellar assemblies such that the wellbore fluid thickener develops viscoelastic characteristics.

12. The wellbore fluid of claim 11 wherein the thickener has the following structure:

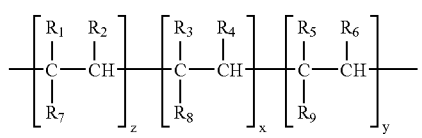

where $R_1, R_2, R_3, R_4, R_5, R_6 =$ H or $CH_3$

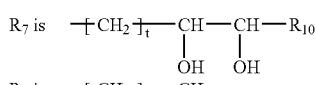

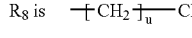

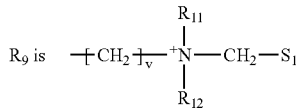

wherein $R_{10}, R_{11}, R_{12} =$ H or $CH_3$, and t=1 to 16, u=6 to 12, v=1 to 18, and x+y+z=3 to 300,000 and $S_1 = CO_2^-$ or $SO_3^-$.

13. The wellbore fluid of claim 12 wherein t=12 to 16, u=6 to 12; v=12 to 18, x=0 to 10,000, y=2 to 300,000 and z=0 to 10,000.

14. The wellbore fluid of claim 11 wherein the viscoelastic surfactant is selected from the group consisting of anionic, nonionic, amphoteric, zwitterionic, alcohols, alkano-lamides, alkanolamines, alkylaryl sulfonates, alkylaryl sulfonic acids, amine acetates, amine oxides, amines, sulfonated amines, sulfonated amides, betaines, block polymers, carboxylated alcohols, alkylphenol ethoxylates, carboxylic acids, fatty acids, ethoxylated alcohols, ethoxylated alkylphenols, ethoxylated amines, ethoxylated amides, ethoxylated fatty acids, ethoxylated fatty esters, fatty esters, fluorocarbon-based surfactants, glycerol esters, glycol esters, heterocyclic surfactants, imidazolines, isethionates, lanolins, lechithins, methyl esters, monoglycerides, olefin sulfonates, phosphate esters, polyethylene glycols, polysaccharides, polyacrylic acids, polyacrylamides, propoxylated alcohols, propoxylated alkylphenols, propoxylated amines, propoxylated amides, propoxylated fatty acids, propoxylated fatty esters, protein-based surfactants, quaternary surfactants, sarcosamines, silicone-based surfactants, soaps, sodium isethionate, sorbitans, sucrose and glucose esters, sulfates and sulfonates of oils and fatty acids, sulfates and sulfonates of ethoxylated alkylphenols, sulfates of alcohols, sulfates of ethoxylated alcohols, sulfates of fatty esters, sulfonates of hydrocarbons and petroleum, sulfosuccinates, taurates, and tridecyl and dodecyl benzene sulfonic acids and mixtures thereof.

15. The wellbore fluid of claim 11 wherein the oligomer or polymer has the following structure:

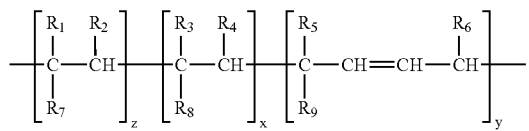

wherein $R_1, R_2, R_3, R_4, R_5, R_6$=H or $CH_3$

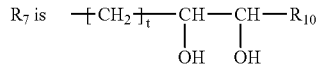

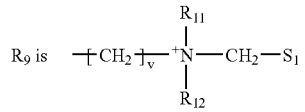

wherein $R_{10}, R_{11}, R_{12}$=H or $CH_3$, and t=1 to 16, u=6 to 12, v=1 to 18, and x+y+z=3 to 300,000 and $S_1$=$CO_2^-$ or $SO_3^-$.

16. The wellbore fluid of claim 15 wherein t=12 to 16, u=6 to 12; v=12 to 18, x=0 to 10,000, y=2 to 300,000 and z=0 to 10,000.

17. The wellbore fluid of claim 11 wherein the oligomers or polymers are crosslinked with polyvalent metal ions, formaldehyde, or glutaraldehyde.

18. The wellbore fluid of claim 17 wherein the polyvalent metal ions are selected from the following: $Fe^{2+}$, $Cd^{2+}$, $Co^{2+}$, $Ca^{2+}$, $Cu^{2+}$, $UO_2^{2+}$, $PbO^{2+}$, $Al^{3+}$, $Fe^{3+}$, $Cr^{3+}$, $Ce^{3+}$, $Ti^{4+}$, $Zr^{4+}$, $Sn^{4+}$ and mixtures thereof.

19. The wellbore fluid of claim 11 wherein the viscoelastic surfactant is zwitterionic.

* * * * *